United States Patent [19]

Vandling

[11] 4,238,775
[45] Dec. 9, 1980

[54] FACSIMILE RECEIVER SIGNALING

[75] Inventor: John M. Vandling, Pleasantville, N.Y.

[73] Assignee: Exxon Research & Engineering Co., Florham Park, N.J.

[21] Appl. No.: 886,136

[22] Filed: Mar. 13, 1978

Related U.S. Application Data

[63] Continuation-in-part of Ser. No. 617,104, Sep. 26, 1975, Pat. No. 4,079,425.

[51] Int. Cl.³ .......................... H04N 1/32; H04N 1/36
[52] U.S. Cl. ..................................... 358/257; 358/264
[58] Field of Search ..................... 358/257, 277, 264

[56] References Cited

U.S. PATENT DOCUMENTS

| | | | |
|---|---|---|---|
| 3,441,665 | 4/1969 | Wuensch | 358/257 |
| 3,496,287 | 2/1970 | Wheeler | 358/257 |
| 3,614,319 | 10/1971 | Krallinger et al. | 358/257 |
| 4,000,371 | 12/1976 | Ogawa | 358/257 |

Primary Examiner—Robert L. Griffin
Assistant Examiner—Edward L. Coles
Attorney, Agent, or Firm—N. L. Norris

[57] ABSTRACT

The receiver of a facsimile system includes a modulator for generating a signal for transmission to a remote transmitting location during predetermined intervals in the absence of received signals during those intervals. The signal from the receiver provides a periodic handshake function. The duration of the signal is short as compared with the duration of the predetermined intervals in which the received signals are absent.

23 Claims, 8 Drawing Figures

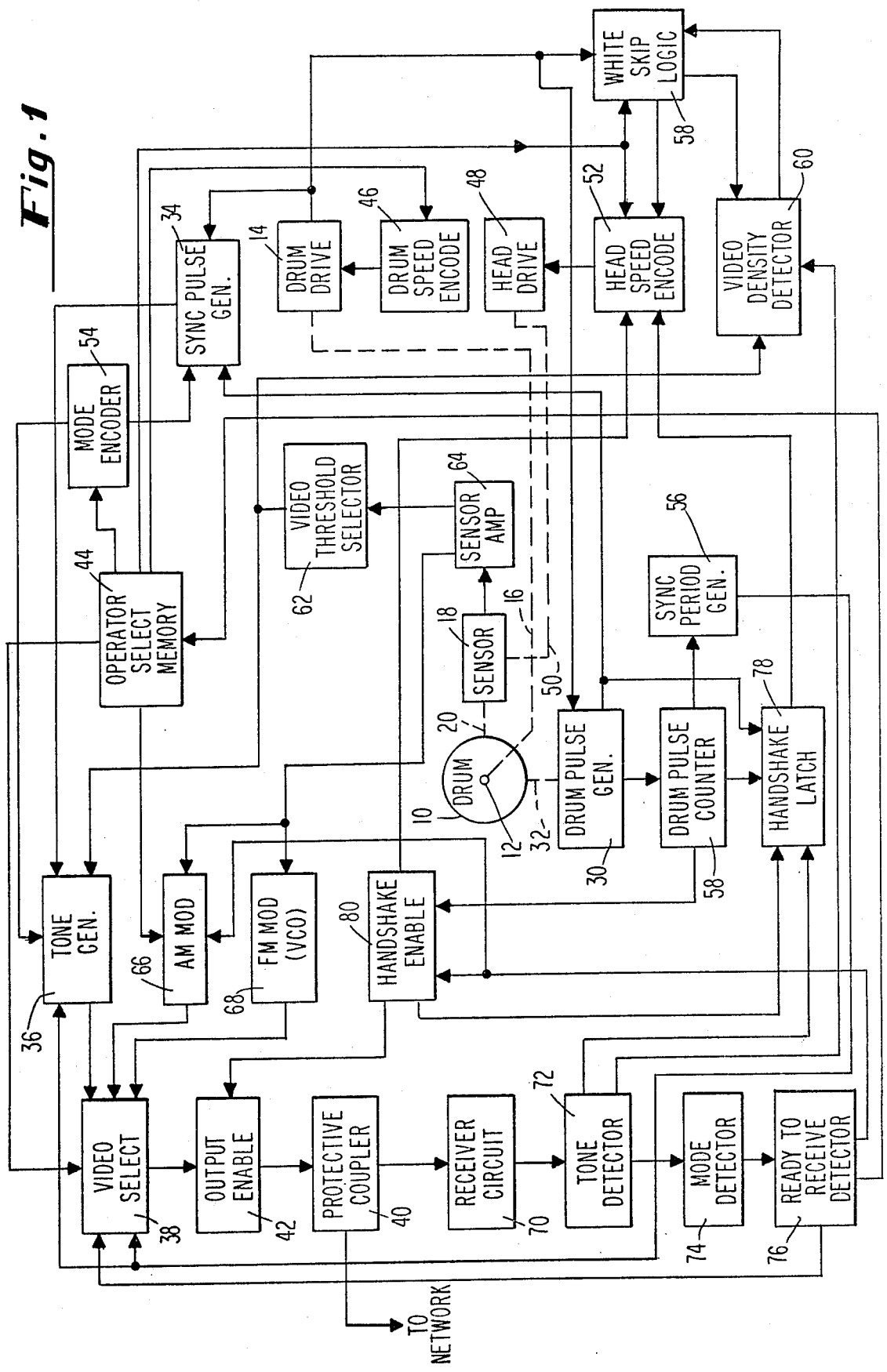

FACSIMILE RECEIVER SIGNALING

RELATED INVENTIONS

This application is a continuation-in-part of copending application Ser. No. 617,104 filed Sept. 26, 1975, now U.S. Pat. No. 4,079,425.

BACKGROUND OF THE INVENTION

This invention relates to facsimile systems comprising a transmitter, a receiver and a communications network therebetween. More particularly, this invention relates to a system wherein a document is scanned in a facsimile transmitter to generate electrical information-bearing signals representing the dark-light variations in the document being scanned. These information-bearing signals are then transmitted over the communications network to a facsimile receiver where the information-bearing signals are converted to marks or images on a copy medium so as to form a copy which is a reasonable facsimile of the original document.

In such facsimile systems, it is frequently desirable to generate handshake signals which are transmitted from the receiver back to the transmitter so as to advise the transmitter of the readiness and capability of the receiver to continue to receive signals. In systems which do not utilize handshake signals, the communications network connection could be broken but the operator at the transmitter would not become aware of the broken connection until the entire document at the transmitter has been scanned. This could result in a considerable consumption of time for an operator at the transmitter or at the receiver. In other situations, it may be desirable for a transmission to be interrupted at the receiver. The transmitter can be advised of this interruption when it fails to receive the anticipated handshake signal.

Heretofore, handshaking in facsimile transmissions has required the use of a portion of the available bandwidth to provide the handshake function. In systems of this type, the facsimile transmitter utilizes a portion of the available bandwidth for the facsimile information transmission while another portion of the available bandwidth is utilized for the handshake signals. Such a full duplex operation is, under some circumstances, considered undesirable since the use of a portion of the available bandwidth for handshake signaling necessarily decreases the rate of transmission of facsimile information through the remaining available bandwidth and can result therefore in increased transmission times. Where a channel is conditioned for a full duplex operation, channel quality for facsimile operation may be adversely affected.

SUMMARY OF THE INVENTION

In accordance with this invention, facsimile handshake signaling is accomplished without necessitating the reduction of the available bandwidth for the facsimile transmission.

In accordance with another object, a receiving facsimile unit in a preferred embodiment of the invention comprises writing means for reproducing dark-light variations on a copy medium. Detector means demodulate received signals representing the dark-light variations and the demodulated signals are coupled to the writing means. Modulator means generate a handshake signal for transmission to the transmitting unit during predetermined intervals in which the received signals representing the dark-light variations are absent.

In accordance with one important aspect of the invention, the handshake signal is of short duration as compared with each of the intervals. In this connection, it is preferred that the handshake signal be sufficiently long for reliable detection, preferably 1 msec. or more. It is also preferred that the time lapse between the end of the handshake signal and the receiving of signals representing dark-light variations be substantially equal to or more than 135 msec. which would represent an unusually large transmission.

In accordance with another important aspect of the invention, the predetermined intervals are substantially equally spaced in time.

In accordance with still another important aspect of the invention, the scanning means moves the writing means in a scanning motion relative to the copy medium and means are provided for interrupting the scanning motion during the intervals. In the preferred embodiment, the scanning means includes a drum rotating about a drum axis and a head moving parallel with the axis in a predetermined direction such that the scanning motion of the head parallel to the axis is interrupted while the drum continues to rotate.

In accordance with yet another important aspect of the invention, the writing means is inhibited during the predetermined intervals.

In a transmitting facsimile unit of a preferred embodiment of the invention, sensor means detect dark-light variations on the document and modulator means coupled to the sensor means generate transmission signals representing the dark-light variations. Detector means demodulate handshake signals transmitted during the predetermined intervals when the transmission signals representing the dark-light variations are absent. The transmitting unit also includes scanning means coupled to the sensor means with means for interrupting the scanning motion of the scanning means during the predetermined intervals.

BRIEF DESCRIPTION OF THE DRAWINGS

FIG. 1 is a schematic diagram of a facsimile transmitting unit in a preferred embodiment of the invention;

DETAILED DESCRIPTION OF A PREFERRED EMBODIMENT

Referring to FIG. 1, the facsimile unit for transmitting signals representing dark-light variations in a document to a remote location is shown in block form. The document containing the dark-light variations is wrapped around a drum 10 which is rotated about its axis 12 by a drum drive 14 through a mechanical coupling depicted by a broken line 16.

A sensor 18 is juxtaposed to the surface of the drum 10 and the document carried thereon so as to optically communicate with the document and the dark-light variations thereon as depicted by a broken line 20.

Figure 1A:
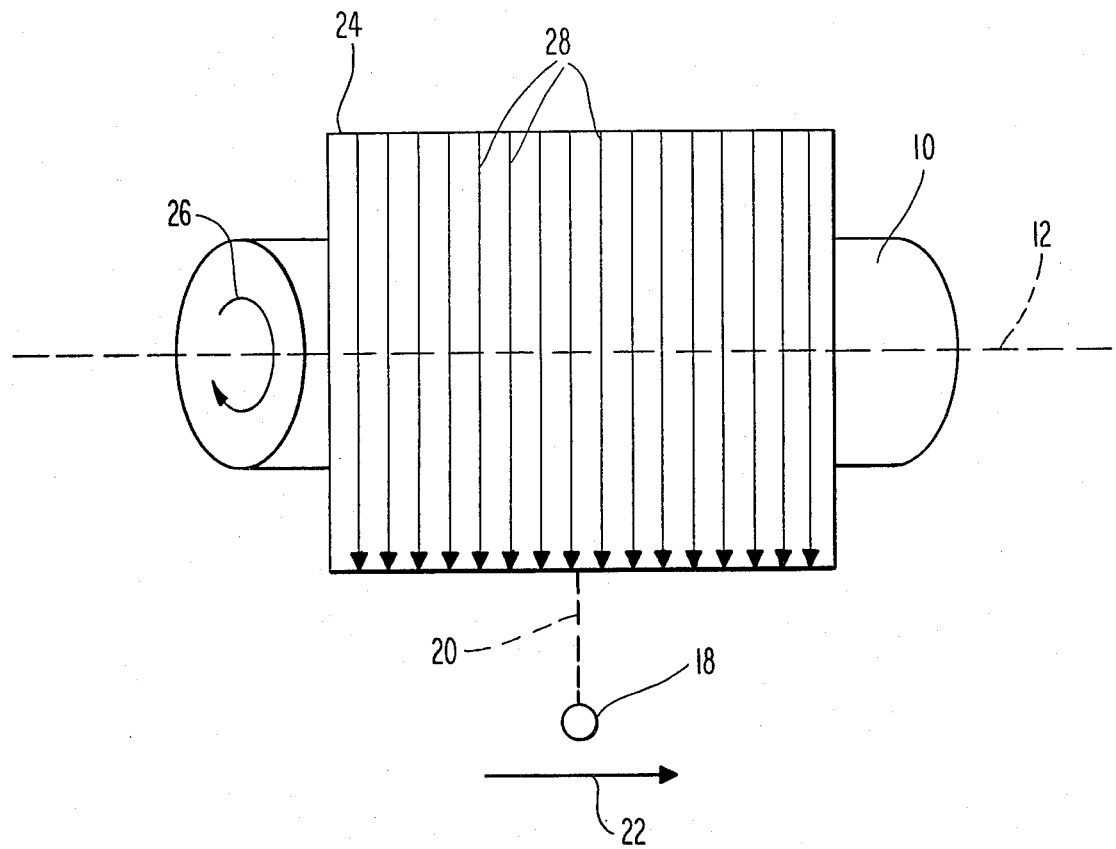
FIG. 1a is a schematic diagram illustrating the scanning of a document by the transmitter of FIG. 1.

Referring to FIG. 1a, the motion of the sensor 18 in a direction depicted by an arrow 22 generally parallel to the axis 12 of the drum 10 produces two orthogonal scanning motions of the sensor 18 relative to a document 24 which is adapted to be wrapped around the drum 10. More particularly, rotation of the drum 10 about the axis 12 in a direction depicted by an arrow 26 produces a plurality of side-by-side scan lines 28 which traverse the document 24 from one edge to an opposing edge in one orthogonal direction while the sensor 18 is advanced in the direction 22 so as to traverse the document 24 from another edge to an opposing edge in the other of the orthogonal directions.

As the drum 10 rotates, a drum pulse generator 30 receiving a tachometric (hereinafter "tach") signal from the drum drive 14 is coupled to the drum 10 as depicted by a broken line 32 produces a pulse for each rotation of the drum 10 about the axis 12. The output from the drum pulse generator 30 is applied to a sync pulse generator 34 to generate a sync pulse representing a predetermined relationship between the position of the drum 10 relative to the sensor 18, and more particularly, the position of the opposing edges of the document 24 which extend parallel with the axis of the drum 12 relative to the sensor 18.

In accordance with the invention of copending application Ser. No. 886,147 filed Mar. 13, 1978, assigned to the assignee of this invention and incorporated herein by reference, the drum pulses from the pulse generator 30 are coupled to the sync pulse generator 34 so as to produce a time lapse between sync pulses which corresponds to a particular scanning rate of the drum 10 which is characteristic of a particular mode of operation for the transmitter. The sync pulses from the sync pulse generator 34 are then applied to a tone generator 36 to produce frequency modulated signals representing the sync pulses and the time lapse between sync pulses. The output from the tone generator 36 is then applied a video select circuitry 38 under the control of an operator select memory 44.

A protective telephone coupler circuit 40 applies frequency modulated synchronizing signals representing a particular scanning mode for the transmitter to the telephone network or other communications link in response to and under the control of an output enable circuit 42 coupled between the protective coupler 40 and the video select circuit 38. The time lapse between synchronizing pulses is under the control of the operator select memory 44 which is coupled to a drum speed encode circuit 46. The output of the drum speed encode circuit 46 is in turn coupled to the drum drive 14 so as to control the tachometric signal applied to the sync pulse generator 34 from the output of the drum drive 14 and the drum pulse generator 30 and thus the time lapse between sync pulses.

As also shown in FIG. 1, the sensor 18 is coupled to a head drive 48 as depicted by a broken line 50. The head drive 48 produces the motion depicted by the arrow 22 shown in FIG. 1a. The particular speed of the sensor 20 as determined by the head drive 48 is under the control of head speed encode circuitry 52 which is coupled to the operator select memory 44 so as to permit the operator to actually select the head speed depending upon the particular scanning mode chosen.

In accordance with another important aspect of the aforesaid application Ser. No. 886,147 filed Mar. 13, 1978 the time lapse between the sync pulses produced by the generator 34 may also represent the scanning rate in the direction 22 as shown in FIG. 1a. In this regard, it will be understood that the particular drum speed in the direction of rotation 26 as shown in FIG. 1a may be chosen to correspond with particular head speeds in the direction 22 so that a time lapse between sync pulses will indicate the scanning rate in each of two orthogonal directions. Accordingly, information is transmitted from the transmitter via the coupler 40 which signals the scanning rate mode in each of two orthogonal scanning directions.

Mode signaling from the transmitter is also accomplished by varying the duration of the sync pulses as well as the time lapse between sync pulses. In this connection, a mode encoder 54 is provided which is coupled to the operator select memory 44 and the sync pulse generator 34. The operator may therefore select a particular synchronizing pulse width to signal a particular mode. Different synchronizing pulse widths may be utilized to signal two different modes having the same drum speed but differing head speeds.

The frequencies of the synchronizing signals including the pulses and the time lapse between pulses are selected and controlled so as to signal particular transmission modes. This is accomplished by the mode encoder 54 which is also coupled to the tone generator 36 so as to produce selected tones or frequencies in response to the output from the sync pulse generator 34 during the synchronizing period. In the preferred embodiment of the invention, the specific single frequencies of the synchronizing signals are utilized to identify a particular mode wherein a particular bandwidth is utilized to transmit the dark-light information after the synchronizing period has been completed as determined by a sync period generator 56 coupled to the output of a drum pulse counter 58 which receives a pulse of each revolution of the drum 10.

The frequencies of the synchronizing signals are also utilized to signal a particular transmission time compression mode. In this particular mode, areas of the document having little or no video information are scanned at faster scanning rates under the control of white skip logic circuitry 58 which is coupled to the head speed encode circuit 52 and the operator select memory 44. When operating in this time compression mode, a high speed enable signal is applied from the white skip logic circuit 58 to a video density detector 60 which determines the density of video or black information on the document. To accomplish this purpose, the video density detector 60 is coupled to a threshold detector 62 which is responsive to the output of a sensor amplifier 64 connected to the sensor 18. The video threshold detector is coupled to the tone generator 36. The output from the video density detector 60 is applied to the white skip logic 58 to indicate low video or dark information density. The white skip logic 58 then signals the high speed encode circuit 52 to speed up the head drive. On the other hand, when the video or black information density increases, the output from the video density detector supplied to the white skip logic 58 reduces the head drive 48 under the control of the head speed encode circuit 52.

The frequency of the synchronizing signals may also be utilized to signal a mode wherein a particular modulation scheme is utilized. In accordance with this aspect of the invention, the transmitter of FIG. 1 includes an AM modulator 66 coupled to the video select circuit 38 and the sensor amplifier 64. The operator select memory 44 is coupled to and capable of activating the AM modulator circuit 66.

As noted previously, the frequency of the synchronizing signals may be utilized to signal the particular bandwidth of a transmission mode. In this connection, it will be noted that an FM modulator 68 in the form of a VCO coupled to the sensor amplifier 64 is provided in addition to the tone generator 36. The FM modulator 68 which is coupled to the video select circuit 38 is capable of providing a relatively large number of gray scale levels of relatively broad bandwidth as compared to the two level (black and white) tone generator 36. In other words, the tone generator 36 when transmitting dark-light information merely transmits black or white in response to the output of the video threshold detector 62 whereas the modulator 68 is capable of providing a gray scale in a broader bandwidth in response to the output of the sensor amplifier 64.

In accordance with the invention of copending application Ser. No. 886,135 filed Mar. 13, 1978, assigned to the assignee of this invention, the transmitter of FIG. 1 includes detector means for demodulating a ready to receive signal originating from and identifying the mode capabilities of a remotely located receiving unit. The detector means includes a receiver circuit 70 having an input coupled to the protective coupler 40 and an output coupled to a tone detector 72. The tone detector 72 is in turn coupled to a mode detector 74 having an output coupled to a ready to receive tone detector 76 which identifies the mode capabilities of the remotely located receiving unit. The output from the ready to receive tone detector 76 is coupled to the video select circuit 36, the operator select circuit 44 as well as the AM modulator 66 so as to permit the selection of AM modulation for transmitting the dark-light information should that be the choice of the operator of the sending unit.

In accordance with this invention, the detector means including the tone detector 72 demodulates handshake signals transmitted from a receiving unit in predetermined intervals when the transmission signals representing dark-light variations in a document are absent. The output from the tone detector 72 is then applied to a handshake latch 78 and an output from the ready to receive tone detector 76 is applied to a handshake enable circuit 80 when the detector 76 detects a receiving unit capable of generating handshake signals. The handshake signals are utilized to advise the transmitter that the receiver is still receiving information from the transmitter. The latch 78 is coupled to the head speed encoder 52 so as to permit a transmission to be aborted should a handshake signal fail to arrive within a predetermined interval at the handshake latch 78. The head drive 48 may then be returned automatically to the start position. The particular intervals are determined at the handshake latch 78 in response to an output from the drum pulse counter 58. The counter 58 is also coupled to the handshake enable circuit 80. The handshake enable circuit 80 also enables the output enable circuit 42. Strobing of the handshake latch 78 at predetermined intervals to determine if the tone detector has detected a handshake signal is accomplished by the output of the drum pulse generator 30.

In order to avoid missing the transmission of any dark-light information during the handshake, it is necessary to inhibit the motion of the head drive 48 but not the drum drive in the transmitting and receiving units during the same predetermined interval. In this connection, the head speed encode circuit 52 is connected to the handshake enable circuit 80 so as to assure that the sensor motion and head drive will be inhibited during the predetermined interval as determined by the drum pulse counter 58.

Figure 2:
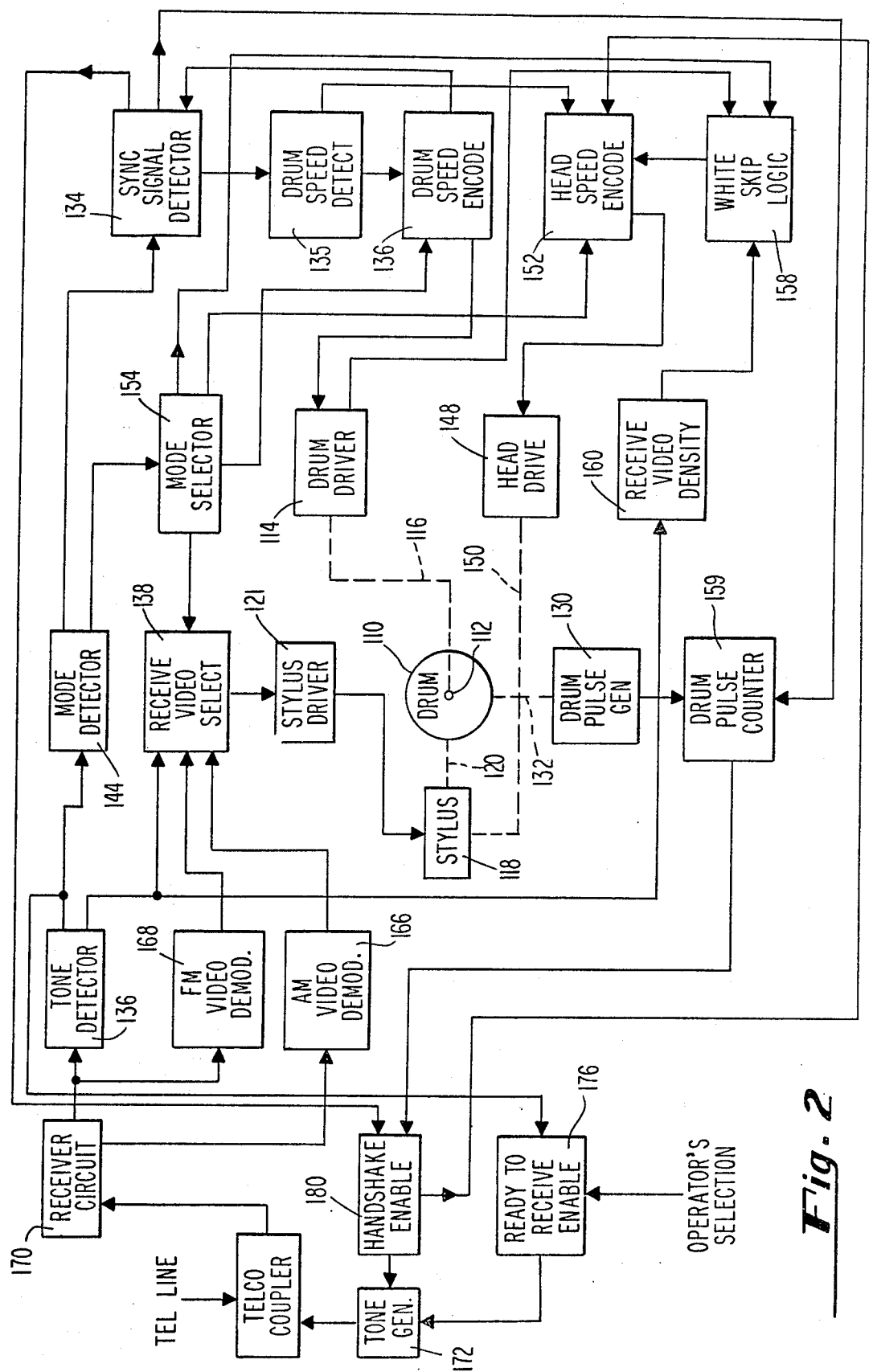
FIG. 2 is a schematic diagram of a facsimile receiving unit in the preferred embodiment of the invention.

Reference will now be made to FIG. 2 wherein a facsimile unit for reproducing dark-light variations on a copy medium in response to received signals from a remote location is shown. The receiving facsimile unit comprises a drum 110 adapted to rotate about an axis 112. The drum 110 is rotated about the axis 112 by a drum drive 114 which is coupled to the drum 110 as depicted by the line 116.

A writing means such as a stylus 118 is coupled to the copy medium carried on the drum 110 as depicted by the broken line 120. The stylus 118 is coupled to a stylus driver 121 which is responsive to the receive video select circuit 138.

For the sake of simplicity, the scanning motion with respect to the copy medium carried by the drum 110 will not be described in detail. It will however be understood that the scanning motion is identical to that described with reference to the document shown in FIG. 1a except that the stylus 118 moves parallel to the axis of the drum 110 rather than the sensor. The motion of the stylus 118 is provided by a head drive 148 which is coupled to a head carrying the stylus 118 as depicted by the broken line 150.

In accordance with the invention of the aforesaid copending application Ser. No. 886,135 filed Mar. 13, 1978, the receiving unit comprises a mode detector 144 coupled to the output of a tone detector 136. The mode detector in conjunction with a mode selector 154, a sync signal detector 134 and a drum speed detect circuit 135 are capable of establishing a mode of operation at the receiver responsive to the particular transmitter mode as detected by the mode detector 144.

More particularly, the sync signal detector 134 and the drum speed detect circuit 135 are capable of determining the time lapse between the synchronizing signals received from the transmitter to establish the appropriate scanning rates for both orthogonal scanning directions at the drum 110. In this connection, the drum speed detect circuit 135 is coupled to both the drum speed encode circuit 126 as well as the head speed encode circuit 152.

The mode selector circuit 154 is also capable of activating the white skip logic circuitry 158 which is coupled to the head speed encode circuit 152. The white skip logic circuit 158 is responsive to the output from the receive video density 160 which is coupled to the tone detector 136 as well as tach signals from the drum drive 114. The output from the white skip logic 158 is applied to the head speed encode 152 to appropriately increase and decrease the scanning rate of the stylus 118 parallel to the axis of the drum 110 in response to the video or black information density received by the receiver circuit 170. In controlling the white skip logic and in accordance with one important aspect of the invention, the mode selector 154 is responsive to the frequencies of the synchronizing signals.

The mode selector 154 is responsive to the duration of the sync pulses in the synchronizing signal to control the scanning rate of the stylus 118. In this connection, the output from the mode selector 154 is applied to the head speed encode 152.

The mode selector 154 is also responsive to the frequencies of the synchronizing signal to place the receiver in a particular mode for receiving a particular type of modulation, i.e., FM or AM, or receiving FM in a particular bandwidth. In this connection, the receive video select circuit 138 is coupled to the output of the mode selector 154 to select one of a plurality of outputs from various detectors including the tone detector 136 which detects a narrow bandwidth FM, an FM video detector 168 which detects a wider bandwidth and an AM video detector 166.

In accordance with the invention of copending application Ser. No. 886,135 filed Mar. 13, 1978, the receiving unit includes a tone generator 172 for generating tones in response to a ready to receive enable circuit 176 so as to identify the mode capabilities of the receiving unit. The ready to receive tone is activated by an operator prepared to receive a facsimile document. Through the generation of appropriate tones, the capability of the receiving unit with respect to AM and FM demodulation and/or white skip logic may be identified by the transmitting unit described with reference to FIG. 1. The ready to receive enable circuit is coupled to the output of the tone detector 136 so as to permit the circuit 176 to be inhibited on receiving a predetermined signal from the transmitter.

In accordance with this invention, the receiving unit includes a handshake enable circuit 180 which is coupled to the tone generator 172. The handshake signal from the handshake enable circuit 180 is generated at predetermined intervals as determined by a drum pulse counter 159 coupled to the output of a drum pulse generator 130. The drum pulse generator 130 is coupled to the drum as depicted by the broken line 132. The handshake enable circuit is only enabled in the receiving unit when the sync signal detector 134 has indicated that a compatible sync signal has been detected. The handshake enable circuit 180 is coupled to the head speed encode circuit 152 to inhibit the head drive during the handshake period.

The handshake enable circuit 180 of the receiver will now be described in detail with reference to FIG. 3. As shown there, the handshake enable circuit comprises a counter 200 having an input coupled to the drum drive 114 and an output coupled to a decoder 202. The counter 200 is reset in response to the output of an AND gate 204.

Figure 4:
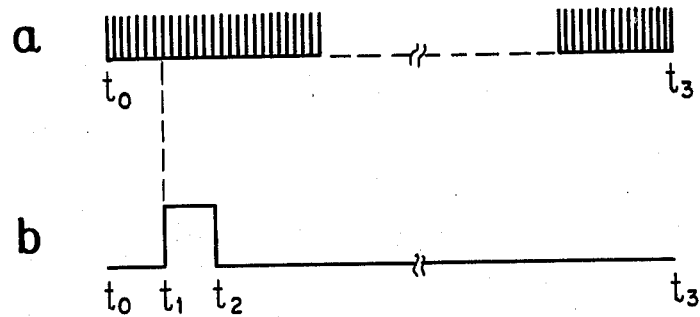
FIG. 4 is a waveform diagram utilized in describing the handshake signal generated by the circuitry of FIG. 3.

In accordance with one important aspect of this invention, the handshake signal is transmitted from the receiver in predetermined intervals when the received signals representing the dark-light variations of a document are absent. These intervals are determined by the drum pulse counter 159 which has an output which enables the AND gate 204 when a predetermined count has been reached. Since a drum pulse is generated after each rotation of the drum, the counter 204 will be enabled after a predetermined count, e.g., after a count of 46 revolutions of the drum. When the AND gate 204 is enabled, the counter 200 is reset and tach pulses from the drum drive 114 as shown in waveform a of FIG. 4 begin to be counted in the counter 200. When the count reaches a predetermined level, the decoder 202 produces an output represented by the pulse shown in waveform b which continues for a predetermined length of time.

In accordance with one important aspect of the invention, this length of time is sufficiently long for detection reliability. As shown in waveform b of FIG. 4, the duration of the handshake signal from time $t_1$ to time $t_2$ is preferably greater than 1 msec. and less than 40 msec. In accordance with another important aspect of the invention, the time lapse between the end of the handshake signal at time $t_2$ and the end of the interval at time $t_3$ is longer than the longest anticipated transmission channel delay. In the preferred embodiment, the time lapse between time $t_2$ and $t_3$ is equal to or more than 135 msec. Note also the presence of the delay $t_0$ to $t_1$ which allows the transmitter sufficient time to change from a transmitting to a receiving mode. Preferably, this delay from $t_0$ to $t_1$ is at least 10 msec.

In accordance with another important aspect of the invention, the scanning motion of the receiver stylus 118 carried by the receiver head is interrupted during the interval time $t_0$ to $t_3$. This interruption is controlled by enabling the AND gate 204 and applying the output to the head speed encode circuitry 152. The head speed encode circuitry 152 then interrupts the scanning motion of the head parallel to the axis of the drum while the drum continues to rotate about the drum axis.

Figure 3:
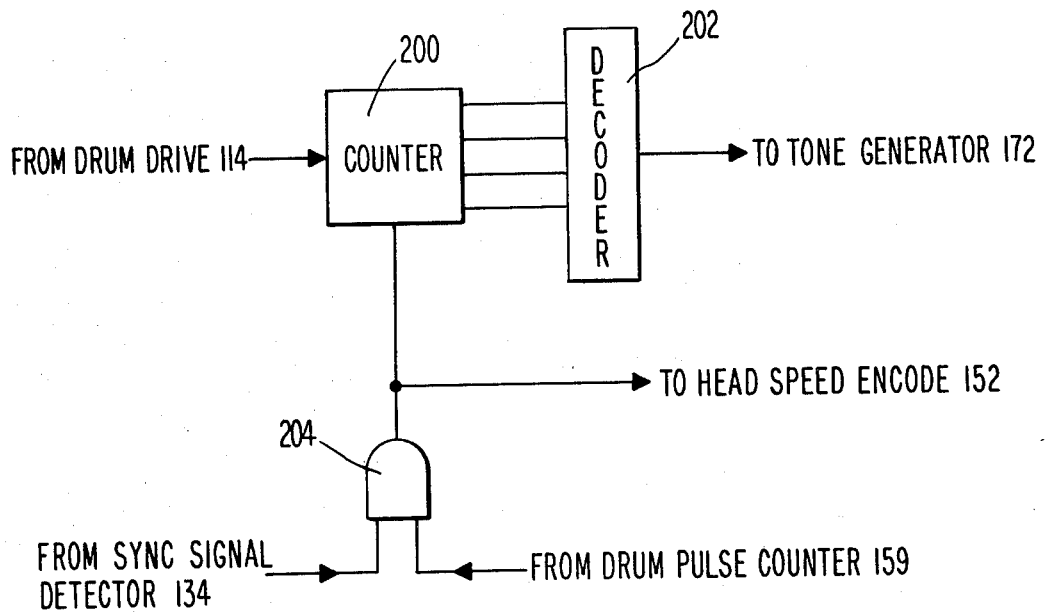
FIG. 3 is a schematic diagram of the handshake enable circuit in the receiving unit of FIG. 2.

As also shown in FIG. 3, the output from the sync signal detector 134 is also applied to the AND gate 204. By providing this input to the AND gate 204, it is possible to only selectively enable the handshake when the sync signal from the transmitting unit is of a particular kind indicating that the transmitting unit is compatible and capable of responding to the handshake signal generated by the tone generator 172 in response to the output of the decoder 202. In the absence of a signal from the sync signal detector 134, AND gate 204 is not enabled regardless of the count from the drum pulse counter 159 and the scanning motion of the head is not inhibited nor is the pulse of waveform b in FIG. 4 generated at the output of the decoder 202 for application to the tone generator 172.

Figure 5:
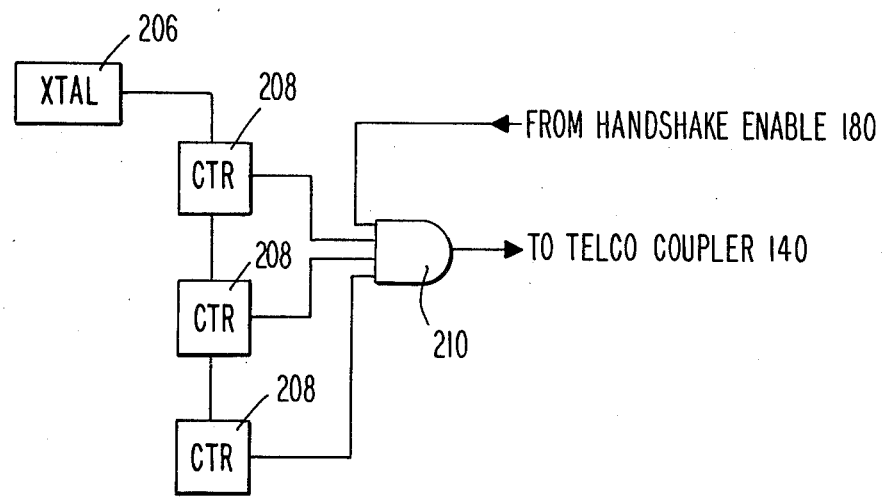
FIG. 5 is a schematic diagram of the tone generator in the receiving unit of FIG. 2.

Reference will now be made to the tone generator 172 as shown in detail in FIG. 5. The tone generator 172 comprises a crystal source 206 connected to a series of counters 208. The output from the counters 208 are applied to an AND gate 210 so as to produce an output of predetermined frequency when the AND gate 210 is enabled by the output signal from the handshake enable circuit 180. Preferably, the outputs from the counters 208 are selected so as to produce a 2415 Hz. signal at the output of the AND gate 210 generally corresponding to a signal representing black in a transmission from the transmitter to the receiver.

Figure 6:
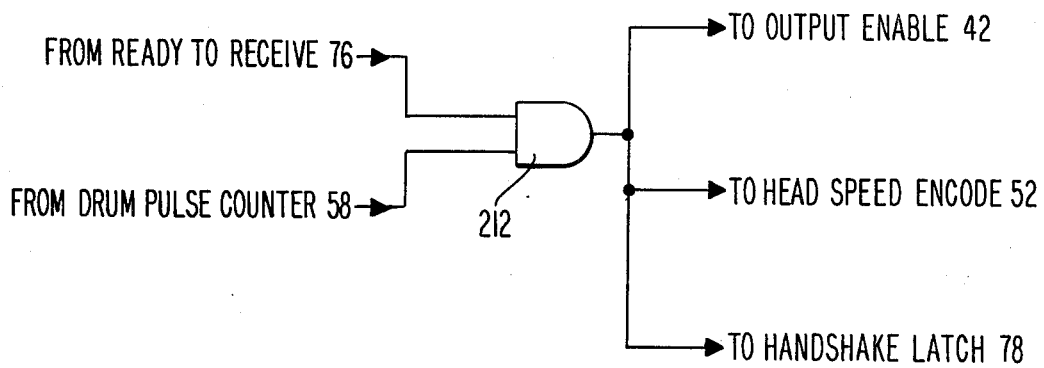
FIG. 6 is a schematic diagram of the handshake enable circuit of the receiving unit shown in FIG. 1.
Figure 7:
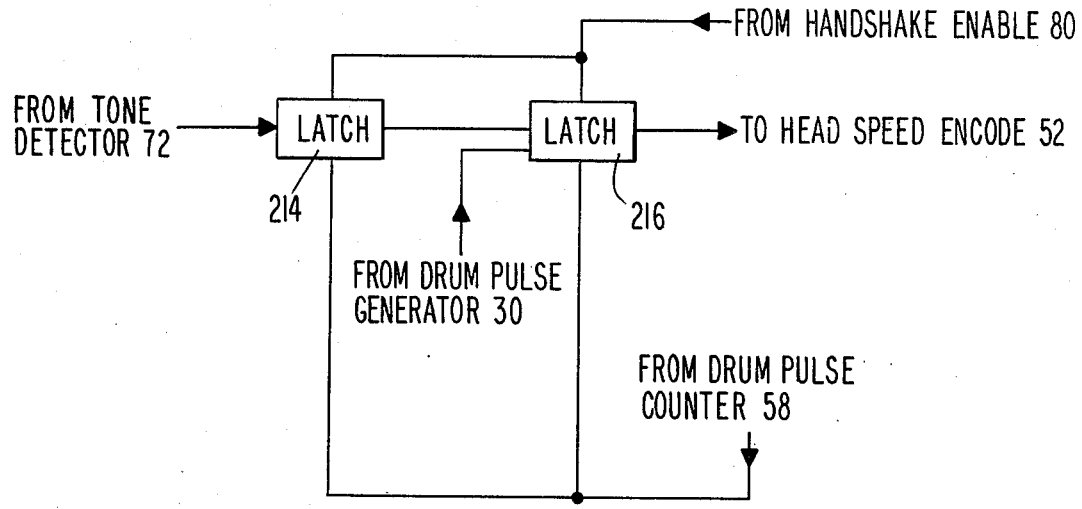
FIG. 7 is a schematic diagram of the handshake latch of the transmitting unit shown in FIG. 1.

Reference will now be made to the handshake circuitry of the transmitter as shown in FIGS. 6 and 7. Referring first to the handshake enable circuit 80 shown in FIG. 6, an AND gate 212 is responsive to inputs from the ready to receive detector 76 and the drum pulse counter 58. The AND gate 212 is therefore only enabled when the output from the ready to receive detector 76 indicates that the receiving unit at the remote location is of a type capable of generating handshake signals and the drum pulse counter 58 has detected a count representing the predetermined interval in which the receiver will be transmitting the handshake signal, e.g., the 46th revolution of the drum 10.

The output from the AND gate 212 of the handshake enable circuit 80 is utilized for three different purposes.

First, the output is applied to the output enable circuit 42 so as to inhibit the transmission of any signals representing dark-light variations in a document during the predetermined interval. Second, the output is applied to the head speed encode circuit 52 so as to interrupt the scanning motion of the sensor on the head in a direction parallel to the axis 12 of the drum 10 as the drum continues to rotate about the axis 12. Third, the output from the AND gate 212 is applied to the handshake latch 78 which will now be described with reference to FIG. 7.

The handshake latch circuit 78 comprises a first latch 214 and a second latch 216. The first latch 214 is coupled to the output of the detector 72 and is set in response to receipt of a tone representing a handshake signal, e.g., 2400 Hz. The latch 214 and the latch 216 are both reset in response to the output from the drum pulse counter which indicates that the predetermined interval for the handshake signal has arrived, e.g., the 46th revolution of the drum. Once the latch 214 is set by the output from the tone detector 72 after the latch 214 and the latch 216 have been reset by the drum pulse counter 58, a strobing pulse applied to the latch 216 from the drum pulse generator 30 will produce a high going output from the latch 216 which is applied to the head speed encode 52. If the tone detector 72 has not detected a tone representing a handshake signal, strobing by the pulse from the pulse generator 30 at the latch 216 will produce a low output and this will signal a failure to receive a handshake signal which will result in the head speed encode circuit 52 returning the head to the start position.

The handshake enable circuit 80 will only allow the latches 214 and 216 to function as described above if the ready to receive detector 76 detects a signal indicating that the receiver has a handshake capability. Otherwise the handshake enable circuit 80 will preset up the latches 214 and 216 to the high state thereby disabling the handshake function of the transmitter.

Although a particular embodiment of the invention has been shown and described, it will be appreciated that other embodiments which will occur to those of ordinary skill in the art will fall within the true spirit and scope of the invention as set forth in the appended claims.

What is claimed is:

1. A receiving facsimile unit for reproducing dark-light variations on a copy medium representing a facsimile of a remotely located document at a transmitting unit, said receiving unit comprising:
   writing means for reproducing dark-light variations on a copy medium;
   demodulating means for demodulating received signals representing said dark-light variations, said demodulating means being coupled to said writing means;
   modulator means for periodically generating an audio frequency handshake signal of predetermined frequency for transmission to said transmitting unit;
   said handshake signal being transmitted in predetermined intervals during transmission of a document in which said received signals are absent.

2. The facsimile unit of claim 1 in which said handshake signal is of short duration as compared with each of said intervals.

3. The facsimile unit of claim 1 wherein said intervals are substantially equally spaced in time.

4. The facsimile unit of claim 1 including scanning control means for inhibiting said writing means during said intervals.

5. The facsimile unit of claim 1 wherein the time lapse between the end of said handshake signal and the end of said intervals is equal or more than 135 msec.

6. The facsimile unit of claim 1 wherein the duration of said handshake signal is preferably greater than 1 msec.

7. The facsimile unit of claim 1 wherein the time lapse between the beginning of each of said intervals and the handshake signal is at least 10 msec.

8. The facsimile unit of claim 1 further comprising scanning means for moving said writing means in a scanning motion relative to said copy medium.

9. The facsimile unit of claim 8 including means for interrupting said scanning means so as to interrupt the scanning motion of said writing means relative to said copy medium during said intervals.

10. The facsimile unit of claim 9 wherein said scanning means includes a drum rotating about a drum axis and a head moving parallel with said axis in said predetermined direction, said scanning motion of said head parallel to said axis being interrupted while said drum continues to rotate.

11. The facsimile unit of claim 10 further comprising scanning control means including means for counting the revolutions of said drum.

12. The facsimile unit of claim 1 wherein said modulator means comprises frequency modulating means.

13. The facsimile unit of claim 12 wherein said handshake signal is represented by a frequency generally corresponding to a dark signal.

14. A transmitting facsimile unit for generating signals representing dark-light variations to a receiving unit for reproducing dark-light variations at a remote location, said transmitting unit comprising:
   sensor means for detecting dark-light variations on a document;
   modulator means coupled to said sensor means for generating transmission signals representing said dark-light variations;
   tone detector means and demodulating means for detecting and demodulating audio frequency handshake signals of predetermined frequency, said signals being periodically transmitted in predetermined intervals during the transmission of a document when said transmission signals are absent.

15. The facsimile unit of claim 14 in which said handshake signal is of short duration as compared with each of said intervals.

16. The facsimile unit of claim 14 wherein said intervals are substantially equally spaced in time.

17. The facsimile unit of claim 14 including scanning control means for inhibiting said sensor means during said interval.

18. The facsimile unit of claim 14 further comprising scanning means for moving said sensor means in a scanning motion relative to said copy medium.

19. The facsimile unit of claim 18 including means for interrupting said scanning means so as to interrupt the scanning motion of said sensor means relative to said document during said intervals.

20. The facsimile unit of claim 19 wherein said scanning means includes a drum rotating about a drum axis and a head moving parallel with said axis in said predetermined direction, said scanning motion of said head parallel to said axis being interrupted while said drum continues to rotate.

21. The facsimile unit of claim 20 further comprising scanning control means including means for counting the revolutions of said drum.

22. A receiving facsimile unit for reproducing dark-light variations on a copy medium representing a facsimile of a remotely located document at a transmitting unit, said receiving unit comprising:

writing means for reproducing dark-light variations on a copy medium;

demodulating means for demodulating received signals representing dark-light variations, said demodulating means being coupled to said writing means;

modulator means for generating a handshake signal of predetermined frequency in the audio frequency range for transmission to said transmitting unit;

said handshake signal being transmitted in predetermined intervals during the transmission of a document in which said writing means does not reproduce dark-light variations.

23. A transmitting facsimile unit for generating signals representing dark-light variations to a receiving unit for reproducing dark-light variations at a remote location, said transmitting unit comprising:

sensor means for detecting dark-light variations on a document;

modulator means coupled to said sensor means for generating transmission signals representing said dark-light variations; and tone detecting and demodulating means for detecting and demodulating audio frequency handshake signals transmitted in predetermined intervals during the transmission of a document when said dark-light variations are not reproduced at the receiving unit.

* * * * *